United States Patent
Lu

(10) Patent No.: US 9,756,896 B2
(45) Date of Patent: Sep. 12, 2017

(54) SMART SHOES WITH WIRELESS TRANSMITTER

(71) Applicant: Honeywell International Inc., Morris Plains, NJ (US)

(72) Inventor: Kui Lu, Shanghai (CN)

(73) Assignee: Honeywell International Inc., Morris Plains, NJ (US)

(*) Notice: Subject to any disclaimer, the term of this patent is extended or adjusted under 35 U.S.C. 154(b) by 0 days.

(21) Appl. No.: 15/206,633

(22) Filed: Jul. 11, 2016

(65) Prior Publication Data

US 2017/0006959 A1 Jan. 12, 2017

Related U.S. Application Data

(62) Division of application No. 14/478,719, filed on Sep. 5, 2014, now Pat. No. 9,414,637.

(51) Int. Cl.
| | | |
|---|---|---|
| *H04W 24/00* | (2009.01) | |
| *A43B 3/00* | (2006.01) | |
| *H04W 4/02* | (2009.01) | |
| *G01S 5/02* | (2010.01) | |

(52) U.S. Cl.
CPC .............. *A43B 3/0005* (2013.01); *G01S 5/02* (2013.01); *G01S 5/0226* (2013.01); *H04W 4/02* (2013.01)

(58) Field of Classification Search
USPC ........ 455/456.1, 404.2; 340/539.13; 370/352
See application file for complete search history.

(56) References Cited

U.S. PATENT DOCUMENTS

| | | | |
|---|---|---|---|
| 7,474,206 B2 | 1/2009 | Bertagna et al. | |
| 8,718,935 B2 | 5/2014 | Miller et al. | |
| 2006/0056388 A1* | 3/2006 | Livingood | H04L 41/12 370/352 |
| 2007/0260421 A1* | 11/2007 | Berner, Jr. | A43B 3/0005 702/160 |
| 2011/0309930 A1* | 12/2011 | Cecchet | A43B 3/0005 340/539.13 |
| 2015/0223016 A1* | 8/2015 | Webb | H04W 4/02 455/456.1 |
| 2015/0271855 A1* | 9/2015 | Livingood | H04L 41/12 455/404.2 |
| 2016/0058128 A1* | 3/2016 | Dalton | A43C 7/06 36/50.1 |

FOREIGN PATENT DOCUMENTS

| | | | | |
|---|---|---|---|---|
| CN | 103230120 A | 8/2013 | | |
| WO | WO 2014172267 A1 * | 10/2014 | | A61B 5/112 |

OTHER PUBLICATIONS

English translation of abstract of CN 103230120(A).
Yoann Charlon et al., A Telemetry System Embedded in Clothes for Indoor Localization and Elderly Health Monitoring; Sensors 2013, 13, 11728-11749; doi:10.3390/s130911728; www.mdpi.com/journal/sensors.

* cited by examiner

*Primary Examiner* — David Q Nguyen
(74) *Attorney, Agent, or Firm* — Conley Rose, P.C.; Kristin Jordan Harkins

(57) ABSTRACT

A locating and tracking system includes shoes, which carry a wireless module. A user walking the area causes clicking or intermittent energizing of a transmitter carried in the module. The transmitter communicates with a plurality of fixed wireless access points, to provide the position and tracking for persons in the area.

20 Claims, 5 Drawing Sheets

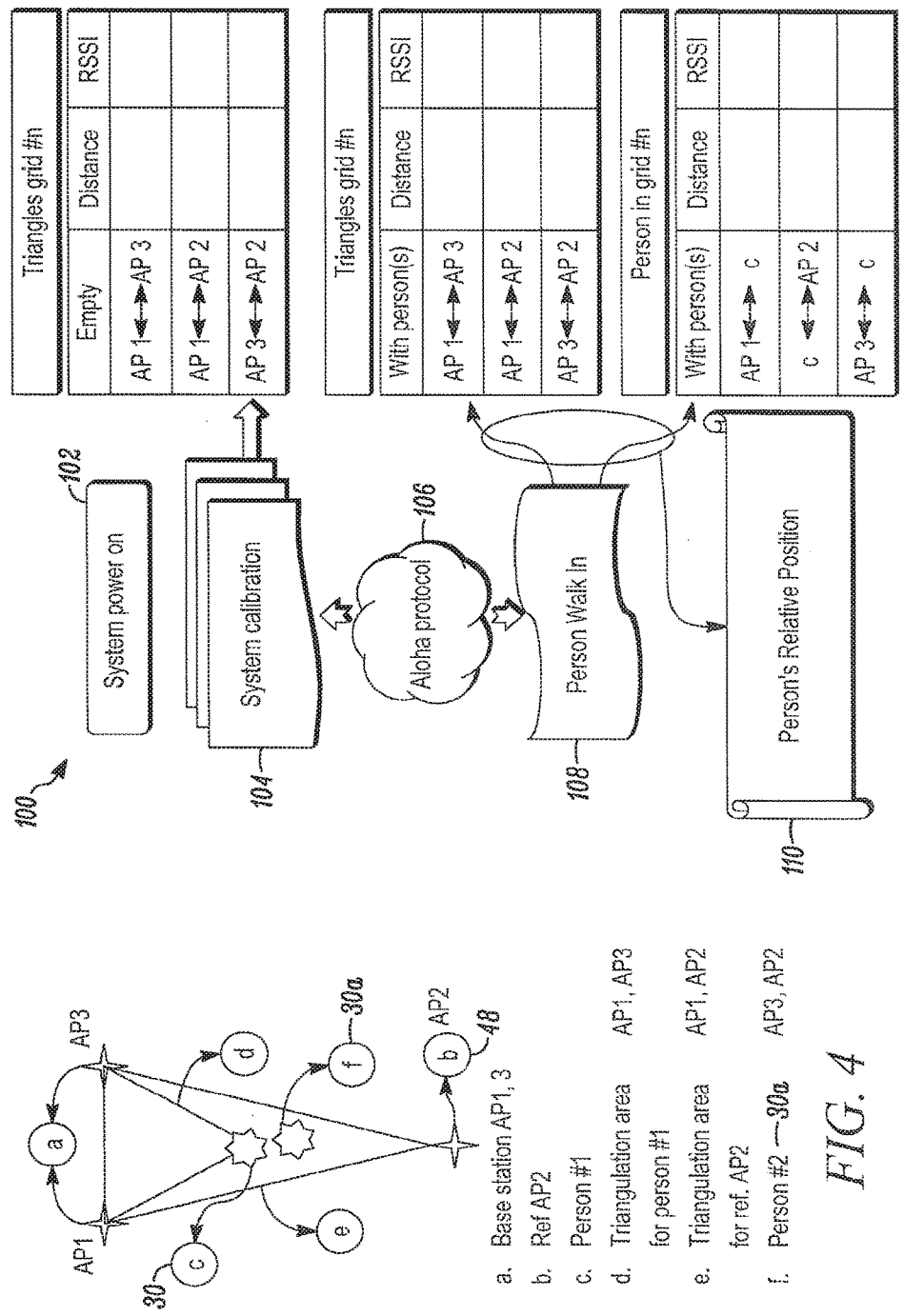

SMART SHOES WITH WIRELESS TRANSMITTER

CROSS-REFERENCE TO RELATED APPLICATIONS

This application is a divisional of and claims priority benefit under 35 U.S.C. §121 to co-pending U.S. patent application Ser. No. 14/478,719, filed on Sep. 5, 2014, and entitled "Smart Shoes with Wireless Transmitter", which is hereby incorporated by reference for all purposes as if reproduced in its entirety.

FIELD

The application pertains to systems and methods of locating and tracking individuals in hazardous locations. More particularly, the application pertains to such systems and methods which provide prompt and automatic reporting of location and movement of individuals in selected, hazardous regions of interest.

BACKGROUND

Many types of work activities require individuals to be present in hazardous regions during their work days. Such occupations include but are not limited to various types of manufacturing, mining, construction and the like. Real time tracking of a person's position provides one more safety guarantee for people present in hazardous working areas. In some close spaces with special safety requirements such as intrinsic safety in the presence of hazardous gases, or, explosives or mines, the normal consumer position products are not able to provide the service with required safety levels.

BRIEF DESCRIPTION OF THE DRAWINGS

FIG. 4 is a diagram illustrating triangulation processing in the system of FIG. 3;

FIG. 5 is a flow diagram illustrating aspects of locating a boot or shoe using the system of FIG. 3.

DETAILED DESCRIPTION

Figure 1:
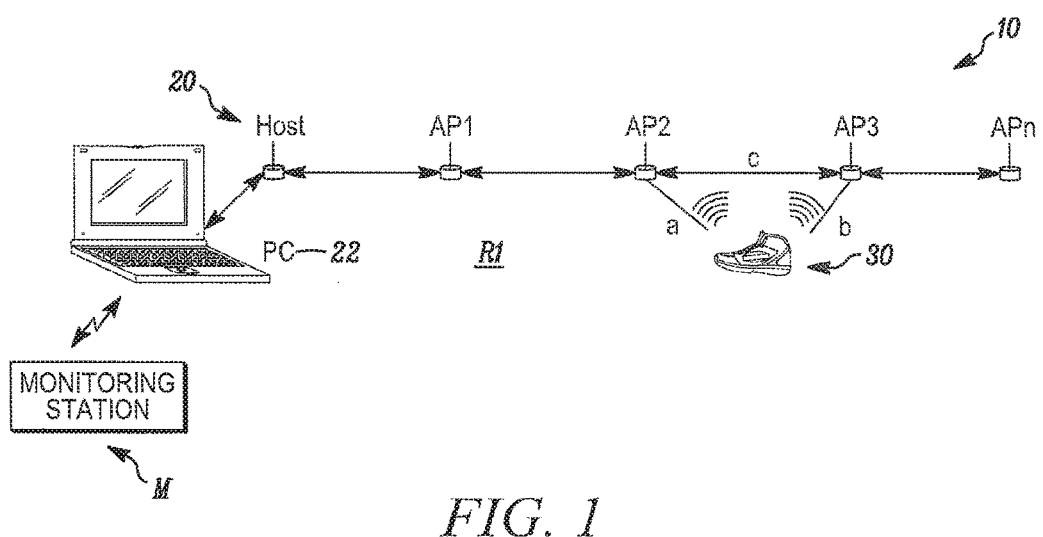
FIG. 1 illustrates a diagram of a system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

In one aspect, embodiments hereof can safely provide both position information and tracking of individuals in hazardous work areas. This can be accomplished by providing smart shoes, which embody a wireless module and clicking or intermittent energizing of a transmitter carried in the module. The transmitter communicates with a plurality of fixed wireless access points, to provide the position and tracking for persons in these areas.

In another aspect, a shoe can carry a battery powered module including a low power wireless transmitter, a force responsive switch, or a clicking device. When a person wears the shoe with the module, the switch or clicking device will respond to applied forces or distortions due to walking and energize the transmitter to intermittently transmit (RF) signal bursts.

Multiple fixed access points (AP) will receive these signals. The wireless signal strength (RSSI) received by each AP in combination with optimized triangulation processing can be used to obtain real time location information for each individual in the region being monitored. The fixed APs can send the position information of those individuals in the region being monitored, to a displaced monitoring center. The person's location and tracking information, or moving trace, will be provided by processing information from the access points, at the monitoring center.

In an embodiment hereof, the process can involve sending out location indicating signals from each person in the area. The access points detect the incoming information as to locations of individuals. The RSSI value associated with each person at each access point can be transmitted from the APs to a displaced monitoring location.

In one aspect, a minimum RSSI value for each person can be sent to the associated monitoring center to carry out location and tracking processing. Advantageously, RSSI errors can be removed by such processing.

In disclosed embodiments, the transmitter equipped boots or shoes are advantageous in that they are wearable and the user wears them as any other shoes or boots. Only one boot or shoe needs to carry a transmitter.

Low power transmitters meet intrinsic safety requirements. Wireless networks of various types can be used with shoes in accordance herewith. Groups of three access points create a triangle grid. Multiple grids can provide coverage over a region of interest.

FIG. 1 illustrates a system 10 in a region R1 being monitored. In system 10, a plurality of access points, AP1, AP2 . . . APn, indicated at 20 are installed in the region R1 being monitored. One of the access points can be designated as a "Host".

The access host point 20 can be in bidirectional communication with each other as well as with a personal computer 22. Neither the exact form of transmission, nor types of modulation are limitations hereof.

Figure 2A:
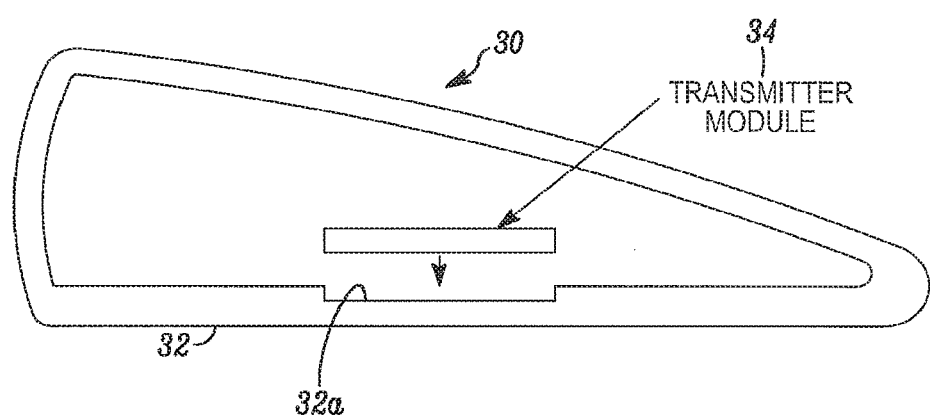
FIG. 2A is a side sectional view of a boot or shoe usable in the system of FIG. 1.
Figure 2B:
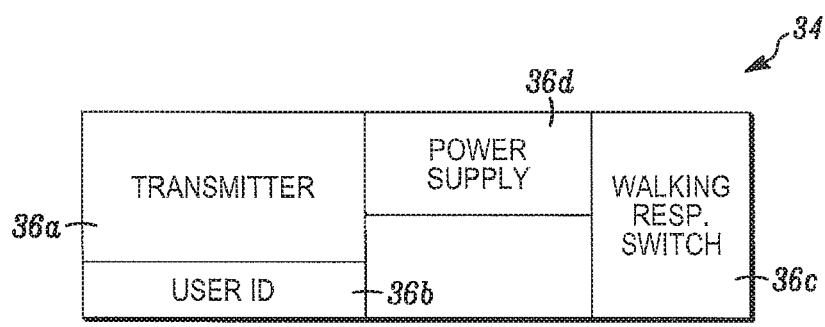
FIG. 2B is a block diagram of a transmitter module insertable into the boot or shoe of FIG. 2A.

Position and tracking information relative to an individual working or moving in the region R1 can be wirelessly coupled to computer 22 for processing there as well as at a displaced monitoring station M. With respect to FIGS. 2A, 2B, the position and tracking information originates with the individual in the region R1 wearing boots or shoes, indicated at 30. The boots or shoes 30 have a walking sole 32 which defines within the boot or shoe 30 a recess or pocket 32a.

A wireless communications module 34 is carried in the recess 32a. The module 34 includes a transmitter 36a, and an identifier of a person 36b, which could be stored in a memory unit of the transmitter 36a. A walking or force responsive switch 36c carried by the module 34 is coupled to the transmitter 36a.

As the individual wearing the boot, shoe, or shoes 30 moves around in the region R1, the switch 36c intermittently changes state in response thereto. Switch 36c is coupled to power supply 36d, also carried by the module 34.

As the switch 36c changes state, it couples electrical energy from supply 36d to transmitter 36a. Transmitter 36a in turn intermittently emits wireless signals having predetermined frequency and modulation characteristics as would be understood by those of skill in the art. The wireless signals, emitted by transmitter 36a are modulated by the identifier 36b of the person wearing the boot, shoe or shoes 30.

The signals emitted by the shoe 30 are sensed by the access points in the vicinity of the shoe 30, such as AP2, AP3 in FIG. 1. As discussed subsequently, signal strength of signals received at the respective access points can be processed and minimum RSSI values can be determined. Triangulation can be used to generate location and tracking information.

Figure 3:
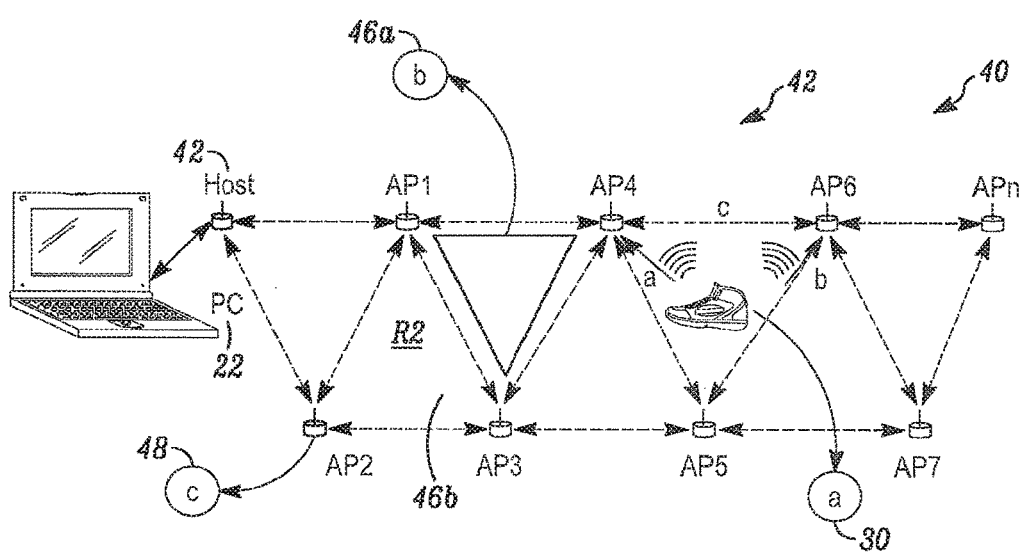
FIG. 3 is a diagram of another system in accordance herewith.

FIG. 3 illustrates another system 40 which can provide tracking and location information for the boot or shoe 30 in response to movement about a region R2 being monitored. A plurality of access points AP1 . . . APn, along with a host access point, generally indicated at 42, are coupled to each other and to a personal computer 22.

In the system 40, a plurality of triangle shaped grids, such as grids 46a, 46b, distributed about region R2 can provide location and tracking information for boot or shoe 30. A reference access point, 48, for example AP2 can facilitate optimized locating triangulation processing.

Figure 6:
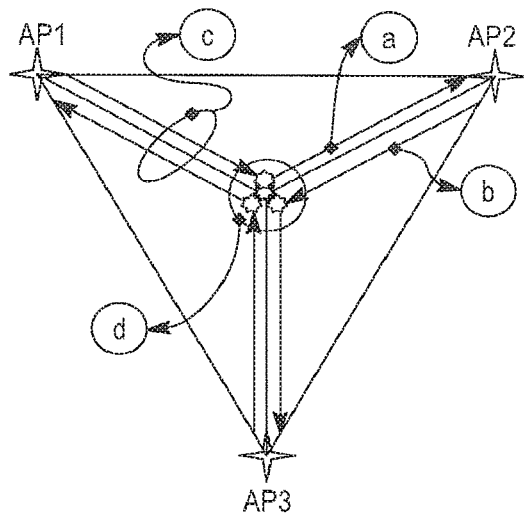
FIG. 6 is a diagram illustrating additional aspects of location processing in accordance herewith.

FIGS. 4-6 illustrate aspects of processing by the system 40. FIG. 4 illustrates triangulation areas for a boot or shoe 30 and two access points AP1, AP3 and AP1, AP2 where AP2 functions as a reference access point.

FIG. 5 illustrates a process 100 in circumstances of empty grids, or where the boot 30 is present in a particular grid. The system 40 is first energized, as at 102. The system is calibrated as at 104 for empty grids. As those of skill will understand, the Aloha protocol can be used, as at 106, to avoid collisions from independent transmitters in different boots such as 30, 30a. Other protocols can be used without departing from the spirit and scope hereof.

Where a person walks into a grid such as the grid formed by access points AP1, AP2, AP3 as at 108, triangulation processing can establish the person's relative position as at 110. FIG. 6 illustrates aspects of grid signal processing to establish a location of the person wearing the boot 30. Processing can be carried out by computer 22 based on signals from the various access points as discussed above. a. APs received RSSI value for person's shoe: RSSI_TX (Person, $AP_n$), n=1, 2, 3; b. Shoe's received RSSI value from $AP_n$: RSSI_RX($AP_n$,Person), n=1, 2, 3: c. Use minimum of two values for triangulation to reduce the RSSI error by reflection, diffraction scattering: RSSI_$AP_n$=min(RSSI_TX (Person, $AP_n$), RSSI_RX($AP_n$,Person)). n=1, 2, 3: d. Calculate the location of person with two APs RSSI_$AP_n$: $P_n$=Tri(RSSI_$AP_n$, RSSI_$AP_m$), m, n=1, 2, 3: >Average of three calculated results to reduce the RSSI error by random noise: P=AVG(P1,P2,P3).

In summary, location identifying transmissions are sent out from the person in the region being monitored, as that person moves through the region. The access points return the location information along with associated RSSI values from the person. The minimum RSSI value can be used as the RSSI value for the person relative to the access points. The RSSI values can be used in carrying out the locating process.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be added to or removed from the described embodiments.

What is claimed is:

1. A system comprising:
   a boot or a shoe comprising:
      an intermittently actuated transmitter, and
      force-responsive pulse circuitry coupled to the intermittently actuated transmitter and configured to actuate the intermittently actuated transmitter in response to an intermittently-applied force,
      wherein the intermittently actuated transmitter is configured to:
         emit an emitted location in response to actuation by the force-responsive pulse circuitry, and
         emit an emitted boot identifier or an emitted shoe identifier in response to the actuation;
   a first access point comprising:
      a first receiver, and
      first processing circuitry coupled to the first receiver; and
   a second access point comprising:
      a second receiver, and
      second processing circuitry coupled to the second receiver,
   wherein the first access point and the second access point are configured to facilitate establishment of a boot location or a shoe location in response to the emitted location and in response to the emitted boot identifier or the emitted shoe identifier.

2. The system of claim 1, wherein the boot or the shoe further comprises a power supply, and wherein the force-responsive pulse circuitry is further configured to further actuate the intermittently actuated transmitter by coupling electrical energy from the power supply to the intermittently actuated transmitter in response to the intermittently-applied force.

3. The system of claim 2, further comprising:
   a first mount configured to hold the first access point; and
   a second mount configured to hold the second access point.

4. The system of claim 3, further comprising location-determining circuitry wherein the first access point is further configured to communicate with the location-determining circuitry in a wired manner or a wireless manner.

5. The system of claim 4, wherein the second access point is further configured to communicate with the location-determining circuitry in the wired manner or the wireless manner.

6. The system of claim 5, wherein the location-determining circuitry is configured to select a minimum of power values for the first access point and the second access point.

7. The system of claim 6, wherein the location-determining circuitry is further configured to make location determinations based on the selecting.

8. A method comprising:
   actuating, by force-responsive pulse circuitry of a boot or a shoe, an intermittently actuated transmitter of the boot or the shoe in response to an intermittently-applied force;

emitting, by the intermittently actuated transmitter, an emitted location in response to actuation by the force-responsive pulse circuitry;

emitting, by the intermittently actuated transmitter, an emitted boot identifier or an emitted shoe identifier in response to the actuation; and facilitating, by a first access point and a second access point, establishment of a boot location or a shoe location in response to the emitted location and in response to the emitted boot identifier or the emitted shoe identifier.

9. The method of claim 8, wherein the actuating comprises coupling, by the force-responsive pulse circuitry, electrical energy from a power supply of the boot or the shoe to the intermittently actuated transmitter in response to the intermittently-applied force.

10. The method of claim 9, further comprising:
holding, by a first mount, the first access point; and
holding, by a second mount, the second access point.

11. The method of claim 10, further comprising communicating, by the first access point, with location-determining circuitry in a wired manner or a wireless manner.

12. The method of claim 11, further comprising communicating, by the second access point, with the location-determining circuitry in the wired manner or the wireless manner.

13. The method of claim 12, further comprising selecting, by the location-determining circuitry, a minimum of power values for the first access point and the second access point.

14. The method of claim 13, further comprising making, by the location-determining circuitry, location determinations based on the selecting.

15. A computer program product comprising computer executable instructions stored on a non-transitory medium that when executed by a processor cause a first access point to:

receive, from an intermittently actuated transmitter in a boot or a shoe and in response to actuation of the intermittently actuated transmitter by force-responsive pulse circuitry in the boot or the shoe, an emitted location;

receive, from the intermittently actuated transmitter and in response to the actuation, an emitted boot identifier or an emitted shoe identifier; and facilitate, in conjunction with a second access point, establishment of a boot location or a shoe location in response to the emitted location and in response to the emitted boot identifier or the emitted shoe identifier.

16. The computer program product of claim 15, wherein the instructions further cause the first access point to determine a received signal strength indicator (RSSI) based on at least one of the emitted location, the emitted boot identifier, and the emitted shoe identifier.

17. The computer program product of claim 16, wherein the instructions further cause the first access point to transmit the RSSI to a monitoring station for triangulation processing to obtain a location of the boot or the shoe.

18. The computer program product of claim 17, wherein the instructions further cause the first access point to communicate with the monitoring station in a wired manner.

19. The computer program product of claim 17, wherein the instructions further cause the first access point to communicate with the monitoring station in a wireless manner.

20. The computer program product of claim 15, wherein the instructions further cause the first access point to communicate with the boot or the shoe in a wireless manner.

* * * * *

UNITED STATES PATENT AND TRADEMARK OFFICE
CERTIFICATE OF CORRECTION

PATENT NO. : 9,756,896 B2
APPLICATION NO. : 15/206633
DATED : September 12, 2017
INVENTOR(S) : Kui Lu It is certified that error appears in the above-identified patent and that said Letters Patent is hereby corrected as shown below:

In the Specification

Column 2, Line 10: Insert --Radio Frequency-- before "(RF)"

Column 3, Line 48: "3:" should read "3;"

Column 3, Line 51: "3:" should read "3;"

Column 3, Line 52: "APn:" should read "APn;"

Column 3, Line 53: "3:" should read "3;"

Column 3, Line 55: "noise:" should read "noise;"

Signed and Sealed this
Twenty-sixth Day of December, 2017

Joseph Matal
*Performing the Functions and Duties of the
Under Secretary of Commerce for Intellectual Property and
Director of the United States Patent and Trademark Office*